UNITED STATES PATENT OFFICE.

WM. M. ARNOLD, OF NEW YORK, N. Y.

IMPROVED COMPOSITION OF IRON AND OTHER METALS.

Specification forming part of Letters Patent No. 55,452, dated June 12, 1866.

*To all whom it may concern:*

Be it known that I, WILLIAM M. ARNOLD, of the city, county, and State of New York, have invented a new and useful Composition of Iron and other Metals, to be used in the arts; and I do hereby declare the following to be a full, clear, and exact description of the same with respect to its ingredients and mode of combination.

The object of my invention consists in compounding with cast-iron while in a state of fusion certain ingredients, hereinafter fully specified, for the purpose of giving it a closer grain and making it stronger, more malleable, less likely to corrode, and more capable of receiving and retaining a high steel-like polish. It is also thereby rendered less liable to become chilled while in process of cooling. On account of these properties it is better adapted to use in the construction of machinery, bridge and architectural castings, car-wheels, shafting, anchors, chains, cannon, and I even contemplate the construction of armor-plates for vessels, railroad-bars, tires for locomotive-wheels, chairs, frogs, rivets, bolts, pipes, elbows, safes, locks, rifle and pistol parts, and even cutlery and tools, to be made from this new composition. Its great resistance to corrosion from salt-water peculiarly adapts it to the construction of propeller-blades.

To enable others skilled in the art to make and use my invention, I will now proceed to describe the ingredients of which it is composed and the manner in which they are compounded. These ingredients are cast-iron, carbonate of soda, copper, tin, zinc, and antimony. These I use in somewhat different proportions, according to the quality of the pig-iron used and of the composition which I wish to produce. For ordinary grades of the crude iron and of the desired composition I prefer about the following proportions: cast-iron, one hundred pounds; carbonate of soda, one pound; copper, one pound; tin, one-half pound; zinc, five pounds; antimony, one-half pound.

The iron may be melted in a common blast or cupola furnace. It should be brought to as high a heat as practicable; there is no danger of its becoming too hot.

In a vessel by itself the copper is first melted. The tin, the antimony, and the zinc are then added, one after the other, in the order just mentioned, each being allowed to melt before the next is added. The whole should then be heated as high as convenient. It should not, however, be made to boil or burn, so as to cause the evaporation or volatilization of the zinc, which will not become volatile at as low a temperature as when heated by itself. When all is ready the soda is placed in the ladle into which the iron is to be drawn. It at once unites with the molten iron and performs its functions. Borax, potter's clay, feldspar, or other flux may then be spread over the melted surface of the iron, though this is not indispensable. The other melted composition is then to be added to this prepared and molten iron. It would be dangerous to make this intermixture in an open vessel, on account of the violent chemical action which takes place as soon as they are brought into contact. In order that they may be safely mingled the vessel which contains the iron may be covered with a cap in the form of an inverted cone, in one side of which a small aperture may be left, through which the composition can be poured. After being thus incorporated the whole is ready to be cast into molds.

The proportions above given are intended to be used in cases where the cast-iron employed is of a medium degree of hardness and where the composition produced is desired to be of a medium quality.

Where the cast-iron to be used is very soft the soda may be dispensed with altogether or a smaller quantity used. A less quantity of zinc may also in such cases be employed, or a larger quantity of copper. Either of these directions, or all together, may be pursued, according to the hardness or softness of the crude metal. The harder the quality of the iron the more soda, the more zinc, and the less copper will be requisite, and vice versa when the crude iron is very soft.

Where the composition to be produced is desired to be of a very soft quality, other things being equal, I use more soda, more zinc, and less copper, and the reverse of all this when the composition is desired to be of a very hard quality.

Where a finer and stronger composition is wanted the quantity of the other ingredients as compared with the iron employed should be increased. In such cases I recommend their use in proportions to be determined by a common integral multiplier—that is to say, they should be double, treble, quadruple, &c., to the above proportions, though this rule is not indispensable.

Some of the above-named ingredients may be omitted altogether, or other ingredients may be used, and still a valuable compound may be produced; but I prefer the ingredients above set forth.

Instead of the metals above mentioned, salts, or oxides containing them, may sometimes be used advantageously, though I prefer the metals themselves.

I do not propose to confine myself to the proportions or precise materials above enumerated, nor is the particular method of manipulation herein set forth regarded as essential. It may be considerably varied without essential prejudice and without a departure from the principle of my invention.

In practice I propose to prepare the alloy intended for use in the manufacture of my composition and to cast said alloy into ingots or other merchantable shape, to be kept on sale in the market. Such ingots will be so compounded as to produce different grades of the final composition and numbered according to the degree of hardness or softness to be produced in such final composition, in order that the manufacturer may know what result he is to produce by the use of ingots having either of the said numbers.

Having thus described my invention, what I claim as new, and desire to secure by Letters Patent, is—

1. The composition produced by the mixture of the ingredients above-described, when made substantially of the proportions and in the manner herein contemplated and set forth.

2. The preparation of an alloy adapted and intended for use in the manufacture of my final composition, and which alloy is composed of copper, tin, zinc, and antimony, in the proportions above contemplated and set forth.

W. M. ARNOLD.

Witnesses:
   R. T. CAMPBELL,
   E. SCHAFER.